Aug. 5, 1930.    O. W. PENDERGAST    1,772,401
GLUE AND PASTE SPREADER
Filed July 20, 1928
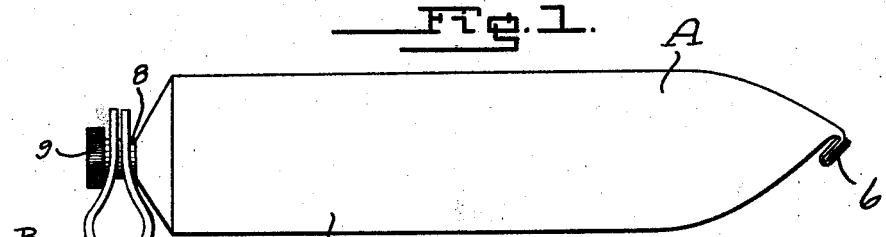
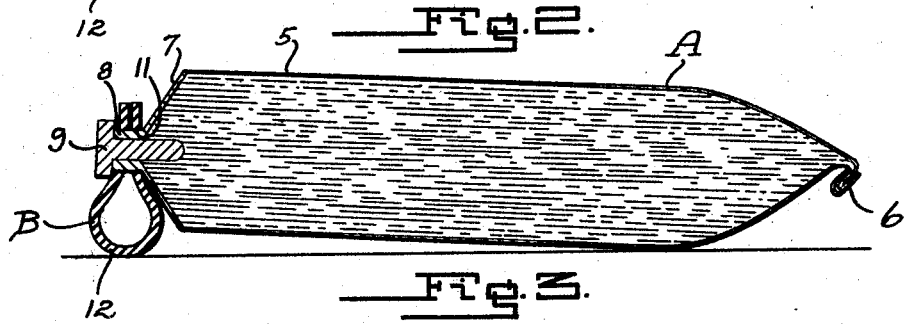
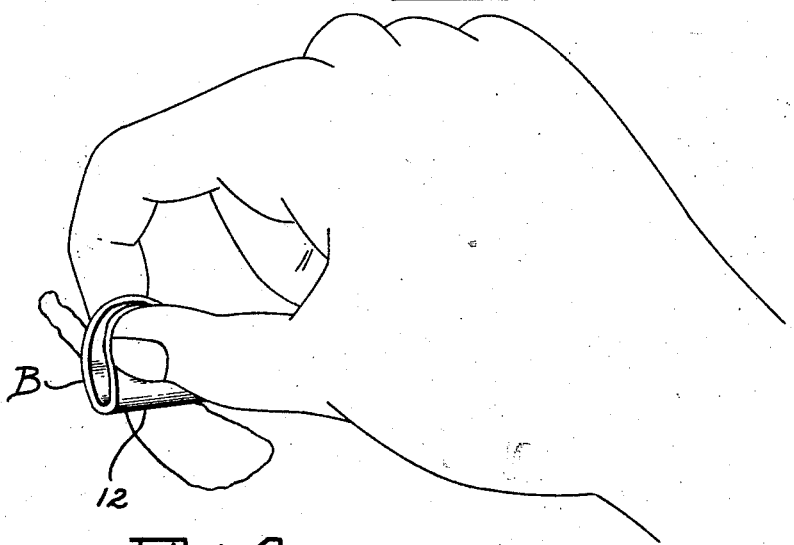
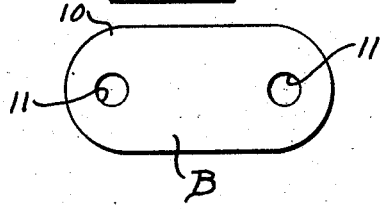
Overton W. Pendergast
INVENTOR.
BY Lancaster and Allwine
ATTORNEYS.

Patented Aug. 5, 1930

1,772,401

UNITED STATES PATENT OFFICE

OVERTON W. PENDERGAST, OF TERRE HAUTE, INDIANA

GLUE AND PASTE SPREADER

Application filed July 20, 1928. Serial No. 294,221.

The present invention relates to improvements in spreaders for semi-fluid substances such as glue and paste, and the primary object of the invention is to provide a novel and efficient device of this nature which may be applied to the neck portions of containers for the material to be spread.

A further object of the invention is to provide an improved glue or paste spreader adapted for detachable connection with the neck portions of collapsible tubes, and which device is retained in coupled relation upon the neck of the tube by the cap or closure plug for the discharge end of the tube.

A further object of the invention is to provide an improved glue or paste spreader for attachment to collapsible tubes, and which spreader is of such nature as to permit of the same being doubled upon itself when applied to the tube for disposing the surface of the spreader having the adhesive thereon, at the inner side of the spreader and thus preventing likelihood of the adhesive coming in contact with objects upon which the tube may be placed.

A further object of the invention is to provide a device of this character which will be efficient in use for spreading materials such as adhesives of different natures and which device may be manufactured at a cost which will permit of the spreader being supplied with the tube of adhesive without any appreciable increase in cost.

A still further and important object of the invention is to provide a spreader of this character which may be used while applied to the tube for spreading the adhesive, and which spreader is of such construction as to permit of a person to obtain an efficient grasp upon the spreader as between the thumb and index finger for using the device when removed from the tube.

Other objects and advantages of the invention will be apparent during the course of the following detailed description, taken in connection with the accompanying drawing forming a part of this specification and in which drawing:

Figure 1 is a view showing the improved spreader as applied to a conventional type of collapsible tube.

Figure 2 is a central longitudinal section thru the tube and showing the manner in which the spreader is retained in position upon the tubular neck at the discharge end of the tube and the manner in which the tube is held from rolling on the surface upon which it is disposed by the spreader loop engaging upon such surface.

Figure 3 is a view showing the manner of using the spreader.

Figure 4 is a plan view of the spreader.

Referring to the drawing in detail, and wherein similar reference characters designate corresponding parts thruout the several views, the letter A designates a conventional type of collapsible tube such as employed for vending glue, paste and other semi-fluid substances, and B the improved spreader for detachable connection with the discharge end of the tube.

The tube A comprises the collapsible body portion 5 being closed at one end by the usual seal 6, and having a head 7 at its opposite or discharge end provided with a tubular neck or nipple 8 thru which the material in the tube may be discharged, and which tubular neck is closed by the closure cap or plug 9. With the form of closure plug shown, the plug is provided at its outer end with an enlargement or head portion providing a finger grip for permitting ready and easy removing and placing of the plug, and this head portion is of a diameter greater than the diameter of the tubular neck 8.

Referring now to the spreader B for detachable connection with the discharge end of the tube or container A, the same is in the form of an elongated flexible strip 10 which may be formed from rubber, rubberized fabric, or other suitably flexible material and which strip is provided adjacent each end with perforations 11 of a diameter to receive the tubular neck 8 of the tube or container A. The flexible strip 10 preferably has rounded ends as clearly shown in Figure 4 and the strip of rubber or other suitable material is intended to be doubled upon itself intermediate its ends for bringing the apertures 11 in aligning relation so that the tubular neck 8 of the container may be inserted thru the aligning apertures in a manner as illustrated in Figures 1 and 2. When the strip is doubled upon itself and applied to the neck 8, the closure plug 9 acts for detachably retaining the spreader coupled to the tube.

When desiring to use the spreader in the manner as shown in Figure 3 for evenly spreading a semi-fluid substance over a surface, the operator first removes the closure 9 which will permit of the spreader being readily withdrawn from the neck 8 of the container. The inherently flat flexible strip may then be doubled upon itself and grasped between the thumb and index finger of the hand, and when so doing it will be seen that the perforations 11 will aid in gaining a firm hold on the spreader. While so grasping the spreader strip, the paste or other material in the tube A may either be applied to the looped portion 12 of the spreader or directly upon the surface over which the material is to be spread. By then drawing the looped portion 12 over the surface the material will be evenly spread by the yielding loop. After using the spreader and when desiring to again apply the same to the neck portion of the tube, the flexible strip is doubled upon itself in a reverse direction from which the strip was doubled for use, thus disposing the surface of the looped portion having the adhesive thereon, at the inside of the strip or loop so that the adhesive will be disposed at a location as to not contact with objects and where the dry crown portion of the loop, which projects beyond the sides of the tube, may rest upon the table or other flat surface to prevent the tube from rolling. This reverse doubling of the flexible strip also enables the operator to replace the spreader upon the neck of the container without getting the adhesive on the fingers. The adhesive which remains on the spreader will dry and flake off by merely bending the spreader backwardly and forwardly and thus leaving a surface suitable for subsequent use as a spreader.

While the improved spreader has been shown associated with a collapsible tube of conventional construction it will readily be apparent that the spreader may be applied to any form of container having a discharge tube or suitable projection for attachment of the spreader either in a looped form as shown or merely by inserting the projection thru one of the apertures 11.

Should it become desirable to use the spreader in its attached position upon the container neck 8, the material may be first applied to the surface over which it is to be spread and the container used as a handle for the spreader.

From the foregoing description it will be apparent that a novel and efficient construction for spreaders of this type has been provided which may be readily applied and retained in position upon the container, and which spreader is of such nature as to evenly and easily spread the material over a surface upon which the material has been applied. It will also be apparent that a device of this character has been provided which is of such nature as to permit of the device being manipulated for concealing the surface which has been used for spreading the material, and which device, while being flexible in nature will permit of a firm grip being maintained upon the spreader during use.

Changes may be made to the specific form and shape of the device as herein shown and described, without departing from the spirit of the invention or the scope of the following claims.

I claim:

1. The combination with a dispensing container having a tubular neck forming a discharge opening and a closure for the opening providing an annular shoulder at the outer end of the neck, of a spreader for detachable connection with the container comprising a flat resilient strip doubled upon itself to provide an intermediate yieldable loop portion and apertured end portions for slidably receiving the tubular neck of the container.

2. The combination with a collapsible tube having a tubular neck portion at one end forming a discharge opening and a closure for the opening providing an annular shoulder at the outer end of the neck, of a spreader for detachable connection with the neck comprising an elongated flat rubber strip having apertured end portions for slidably receiving the neck of the tube when the strip is doubled upon itself, and which strip when positioned upon the neck of the tube providing a looped portion extending transversely of the axis of the tube with the crown portion of the loop projecting beyond the sides of the tube.

3. A spreader of the class described consisting of an elongated inherently flat rubber strip having an aperture provided adjacent each end thereof, said strip when doubled transversely upon itself providing end finger grip portions and a yieldable intermediate spreader loop.

OVERTON W. PENDERGAST.